E. D. SHAW.
ILLUMINATED FENDER.
APPLICATION FILED MAR. 5, 1915.
1,145,087.
Patented July 6, 1915.
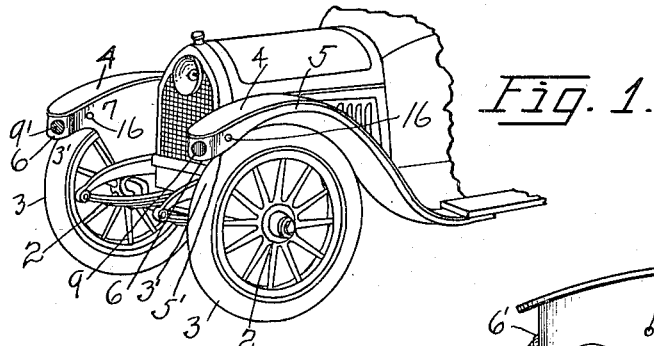
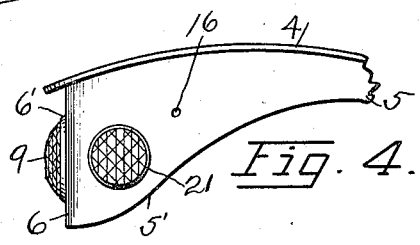
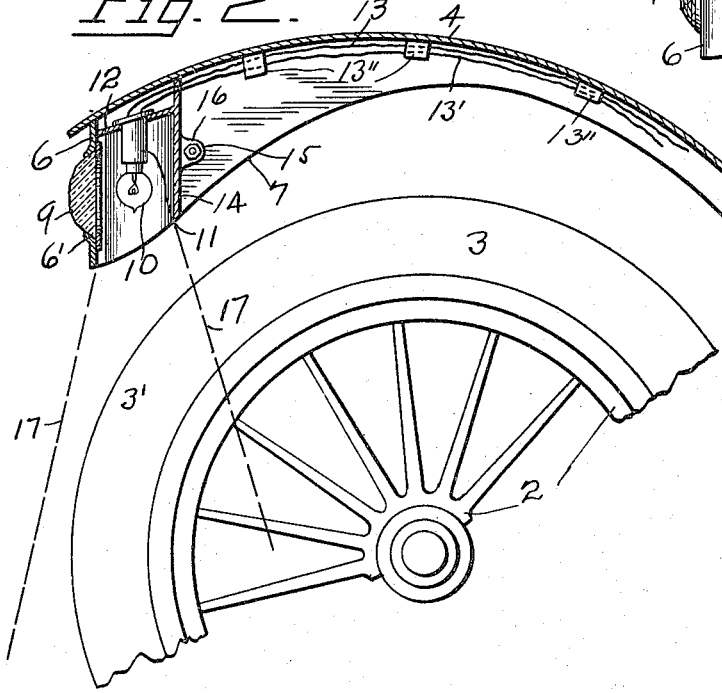
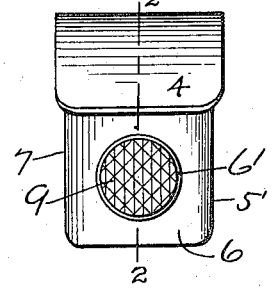
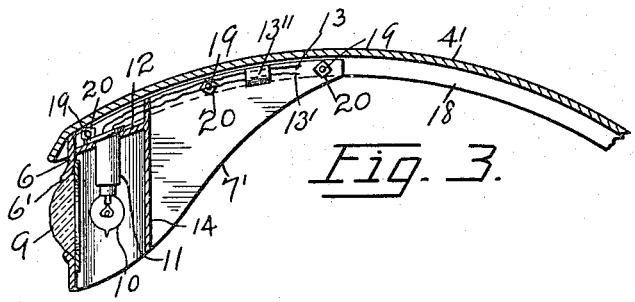
WITNESSES:
A. C. Thomas
M. H. Eagan
INVENTOR.
Edmund D. Shaw
BY Harry D. Wallace
ATTORNEY.

UNITED STATES PATENT OFFICE.

EDMUND D. SHAW, OF SYRACUSE, NEW YORK.

ILLUMINATED FENDER.

1,145,087.

Specification of Letters Patent. Patented July 6, 1915.

Application filed March 5, 1915. Serial No. 12,450.

*To all whom it may concern:*

Be it known that I, EDMUND D. SHAW, a citizen of the United States, residing at Syracuse, in the county of Onondaga and State of New York, have invented certain new and useful Improvements in Illuminated Fenders, of which the following is a specification.

This invention relates to illuminated fenders, designed for use in connection with automobiles and other vehicles, and has for its object to provide a novel, simple, effective and inexpensive illuminating device, consisting of an electric lamp which is disposed in the forward end of each of the fenders of the vehicle, and one or more jewels or lenses for projecting either white or colored lights directly ahead, and substantially in line with the extreme lateral limits, of the vehicle. And a further object is to provide novel and simple means for illuminating the front wheels of the vehicle for indicating to approaching drivers the exact position of the car in the roadway, thus enabling them to judge and gage the distance required for the safe clearance of the passing vehicles.

A practical embodiment of the invention is illustrated in the accompanying drawing, forming a part of this specification, in which similar characters of reference are assigned to corresponding parts in the several views.

Figure 1 is a perspective view of a portion of an automobile; showing the application of my improvement to the opposite front fenders. Fig. 2 is a central vertical longitudinal section, taken on line 2—2 of Fig. 5; showing the construction and arrangement of the parts embodying one form of the invention. Fig. 3 is a similar sectional view; showing my improvement applied to an old fender. Fig. 4 is a side elevation of a fender; showing a plurality of jewels for projecting signal lights in different directions. Fig. 5 is a front end view of the fender shown in Figs. 1 and 2. Fig. 6 is a similar front end view; showing transparent letters instead of the jewels.

Heretofore, the front signal lamps carried by automobiles have consisted of bright white lights, which are usually intensified by powerful reflectors, and these lights are disposed upon or adjacent the opposite sides of the comparatively narrow hoods of the cars, but invariably between the hoods and the fenders. These side lights are generally positioned a considerable distance rearwardly of the forward extremities of the car, and also a considerable distance above the front wheels and fenders, so that none of the rays of the lights fall upon the front wheels. The entire front of the car is therefore unilluminated, and persons traveling in the opposite direction and meeting such a car, are usually dazzled by the bright head-lights, and are unable, in the darkness, to determine either the character of the approaching car, or just how much of the car extends laterally beyond the head-lights. Many collisions and side-wipings of opposing vehicles have resulted in dark places due to the aforesaid disposition and arrangement of the head-lights.

It is a particular object of the present invention to overcome the trouble referred to and to obviate or lessen the danger of accidents, by providing novel and simple means for illuminating the forward tips or ends of the fenders, either by the use of white lights, or by the employment of differently colored lights, which are so disposed that the extreme lateral limits or margins of the vehicle may be clearly discerned, and also that certain parts of the forward end of the vehicle are illuminated to such extent that the character and position of the vehicle may be readily and accurately determined.

I will now describe my invention in detail.

In the drawing, 2 represents one of the front wheels of an automobile, including the tire or shoe 3.

4 represents the top or body of the fender, which is disposed directly over the wheel 2, the said body consisting of sheet metal, which is curved or crowned in the usual manner. Beneath the body 4 and near its opposite side edges is disposed the depending sheet metal flanges which may be secured to the body in any suitable manner. The portion 5 (see Fig. 1) of the outer flange which is disposed directly above the center of the wheel is usually narrow, and as it extends forwardly it increases in depth and approaches closer to the shoe 3, as at 5′. The metal of the flange is then curved or bent toward the opposite side of the car to provide a closed front, as at 6, after which the metal is again bent and extended rearwardly beneath the inner edge of the body 4, thus providing the inner flange 7. The enlarged portions 5', 6 and 7 of the flanges, together with the end portion of the body 4, comprise an inverted pocket or chamber in which the illuminating agent is disposed, the said pocket being closed on all sides excepting its bottom which faces the forward top portion 3' of the shoe. The front 6 of the flange is perforated at 6', and in this perforation is disposed a jewel or lens 9, which may be rigidly secured to the flange in any suitable manner, and the said jewel may be either clear or colored. The jewel 9 is illuminated by an electric lamp 10, which screws into a socket 11, and the said socket is made fast to a support 12 which lies beneath the forward end of the body 4, and directly behind the part 6. Wires 13 and 13' supply the lamp with electric current, and these extend beneath the body 4, between the flanges, and are held in place by clips 13".

14 represents a shield or guard, preferably consisting of sheet metal which is disposed substantially parallel to the wall 6, and which protects and shields the lamp 10 from dirt thrown up by the wheel. The guard 14 may be secured to the flanges 5' and 7 in any suitable manner, or by means of lugs 15 and bolts or rivets 16, and the support 12 may be an integral part of the guard, as shown. The lamp 10 preferably depends from the support 12, and its filament is disposed in line with the axis of the jewel 9. The side of the shield facing the lamp is preferably bright and acts as a reflector for focusing the rays of the lamp upon the jewel 9. The whole interior of the lamp chamber has preferably a bright tinned surface for reflecting the light downwardly through the open bottom of the chamber upon the front portion 3' of the wheel, as indicated by the dotted lines 17 in Fig. 2.

Fig. 3 illustrates a slight modification of the device, in which the fender consists of the body 4', and the usual narrow depending flanges 18. The illuminating parts are exactly the same as shown in Figs. 1, 2, 4 and 5, except that the flange portions corresponding to 5' and 7 are made shorter, as at 7', and these are detachably secured to the flanges 18 by bolts or rivets 19 and nuts 20. This construction is followed when my improvement is applied to fenders already in use on a car.

In Fig. 4, I have shown the outer flange portion 5' perforated to receive a second jewel 21, for casting a colored or other signal light at right angles to the jewel 9.

Fig. 6 illustrates a fender similar in all respects to Figs. 1, 2 and 5, except that several letters 22 are cut out of the front wall 6", to designate the name of the owner or maker of the car. Numbers or any other characters or mottos may be substituted for the letters, if desired. The letters 22 may be covered in a well-known manner with glass or other transparent substance for producing white or colored letters.

In practice, I prefer to employ a red jewel, as 9 in the left-hand front fender, for indicating to approaching vehicles the "passing side", while the jewel, as 9' (see Fig. 1) in the right-hand fender is preferably green, as indicated. By this disposition and arrangement of the colored lights, approaching vehicles will understand that a car equipped with my improvement is coming toward them, and that the red light indicates the passing side of the car. And furthermore, the driver of an approaching vehicle will be able instantly to judge how much clearance should be allowed in order that the two vehicles may pass in safety, for the reason that the jewels 9 and 9' are respectively positioned within an inch or two of the extreme lateral limits of the car.

It is obvious that some changes or modifications may be made in the parts of the device, within the scope defined by the appended claims, without departing from the spirit of the invention.

Having thus described my invention, what I claim as new and desire to secure by Letters, Patent, is—

1. In a device of the class described, a vehicle fender consisting of the body disposed above the wheel of the vehicle, a flange depending from the underside of said body, said flange bent to form a pocket having an opening facing the wheel, a jewel carried by said fender for casting a signal light ahead of the vehicle, and a lamp disposed in said pocket adapted to illuminate said jewel and also the forward portion of the vehicle wheel.

2. The combination with a vehicle fender, including a depending flange skirting its front and lateral edges, a jewel disposed in the front portion of said flange, an electric lamp disposed behind said jewel, and a shield secured to said flange, said shield supporting said lamp and serving as a reflector for projecting the rays of light forwardly and downwardly, substantially as described.

3. The combination with the body of a fender, of a depending flange skirting the marginal edges of said body for forming a pocket having an open bottom facing the wheel of a vehicle, a jewel disposed in the closed end of the flange, an electric lamp disposed in said pocket behind said jewel, a guard disposed behind said lamp, said guard having a reflecting surface facing said jewel, and a support for said lamp, said support connected to said guard.

4. An illuminated fender, comprising in combination the body of the fender, a depending flange secured to the marginal edges of the body and forming a lamp chamber closed at one end, a jewel disposed in the closed end of the flange, a lamp for illuminating said jewel, and a shield for closing the opposite end of said chamber, said shield supporting said lamp and focusing the rays of light upon said jewel, said shield also reflecting a portion of the light of the said lamp downwardly through the open bottom of the chamber for illuminating the front wheel of a vehicle.

In testimony whereof I affix my signature in presence of two witnesses.

EDMUND D. SHAW.

Witnesses:
HERBERT B. MYRON,
HARRY DE WALLACE.